United States Patent

Sensabaugh et al.

[11] Patent Number: 5,933,489
[45] Date of Patent: Aug. 3, 1999

[54] METHOD AND APPARATUS FOR HANDLING SUBSCRIPTION AND ADMINISTRATIVE REQUESTS IN A LOCAL SERVICE MANAGEMENT SYSTEM

[75] Inventors: Thomas H. Sensabaugh, Naperville, Ill.; Jatinder S. Hayer, Eatontown, N.J.; Nilay Ghoghari, Bedminster, N.J.; George M. Tsacnaris, Piscataway, N.J.; William F Woodbury, Rockaway, N.J.; John Phillip Malyar, Hillsborough, N.J.; Elie Rosenfeld, Highland Park, N.J.; Manish Bhardwaj, Edison, N.J.; Lifang Joann Xu, Morganville, N.J.

[73] Assignee: Telcordia Technologies, Inc., Morristown, N.J.

[21] Appl. No.: 08/908,942

[22] Filed: Aug. 8, 1997

Related U.S. Application Data

[60] Provisional application No. 60/051,206, Jun. 30, 1997.

[51] Int. Cl.[6] .................................................. H04M 3/42
[52] U.S. Cl. ............................ 379/219; 379/207; 379/230
[58] Field of Search .................................... 379/207, 211, 379/219, 220, 221, 229, 230, 201

[56] References Cited

U.S. PATENT DOCUMENTS

| 5,519,772 | 5/1996 | Akman et al. | 379/265 |
| 5,533,115 | 7/1996 | Hollenbach et al. | 379/220 |
| 5,623,541 | 4/1997 | Boyle et al. | 379/136 |
| 5,696,816 | 12/1997 | Sonnenberg | 379/220 |
| 5,761,291 | 6/1998 | Dalton | 379/220 |
| 5,771,284 | 6/1998 | Sonnenberg | 379/220 |

*Primary Examiner*—Scott Wolinsky
*Attorney, Agent, or Firm*—Joseph Giordano; David A. Hey; Elizabeth A. Mark

[57] ABSTRACT

To support local number portability and service portability in a telephone network, a method and apparatus handle subscription and administrative service requests in a local service management system to maintain records at a service control point. The subscription requests include create, modify, and delete requests of records in the service control point. The administrative service requests include Numbering Plan Area (NPA) code split, mass change, and query and resend requests. The records at the service control point are accessible by switches via respective signal transfer points to determine the network addresses of the switches handling services and calls corresponding to a particular telephone number.

18 Claims, 7 Drawing Sheets

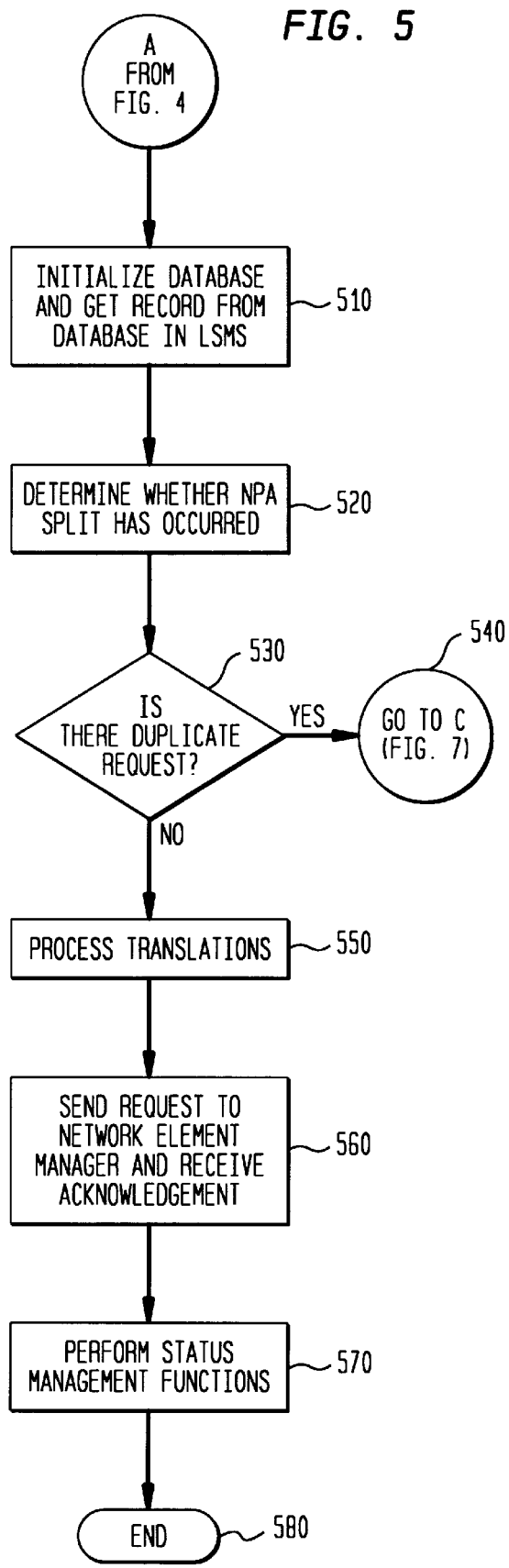
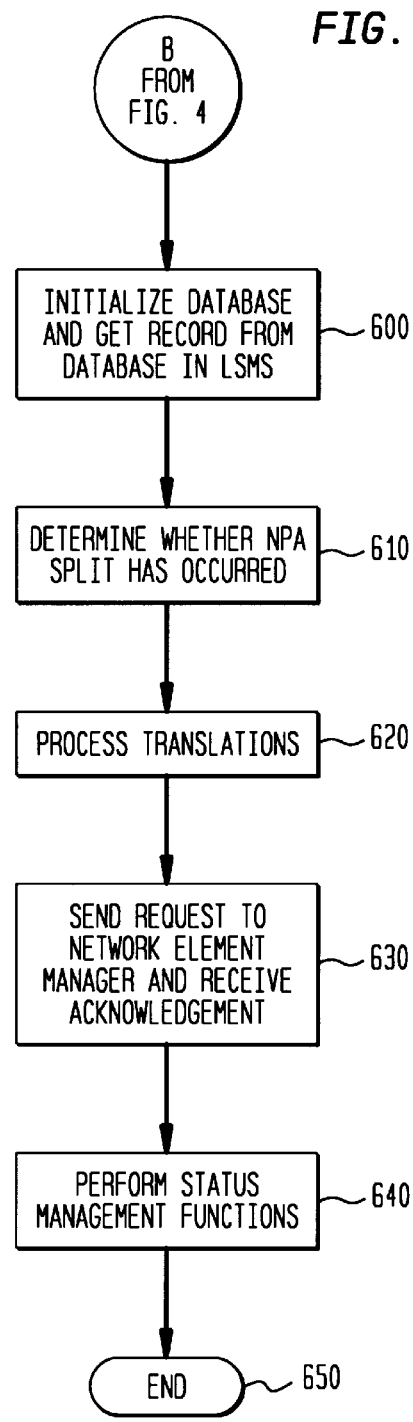
FIG. 5
FIG. 6

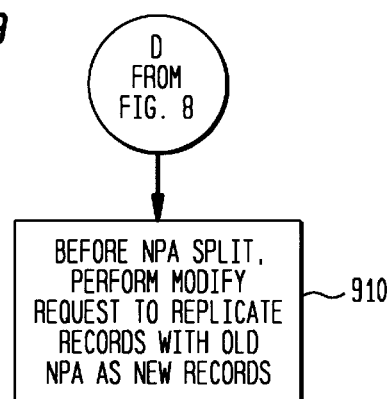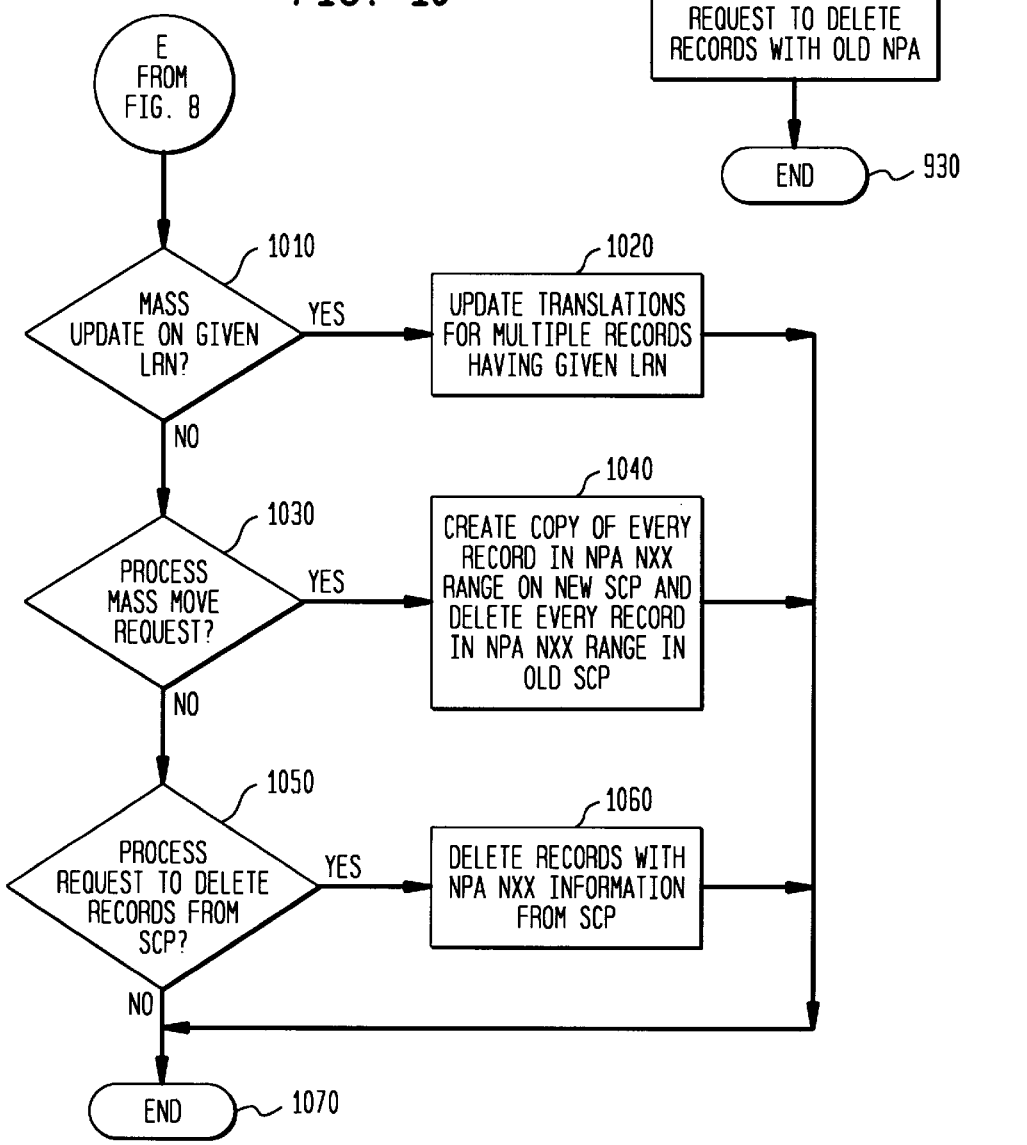
FIG. 9
FIG. 10

METHOD AND APPARATUS FOR HANDLING SUBSCRIPTION AND ADMINISTRATIVE REQUESTS IN A LOCAL SERVICE MANAGEMENT SYSTEM

This application claims the benefit of U.S. Provisional No. 60/051,206 filed Jun. 30, 1997.

TECHNICAL FIELD

The present invention relates to telephone systems. More particularly, the invention relates to a method and apparatus for handling subscription and administrative requests in a local service management system, particularly for systems allowing for local number portability.

BACKGROUND ART

In the existing telephone network, customers are assigned telephone numbers based upon where their telephones are geographically located or fixed. For example, each telephone number may contain numbers representing (1) a three-digit numbering plan area code (NPA code) which uniquely identifies a defined geographic area at which the customer's telephone is located, (2) a three-digit end office code (NXX) identifying a central office exchange that handles calls within that geographic area, and then (3) a four-digit line number uniquely representing the customer within the central office exchange.

The existing telephone network is conventionally made up of a series of connected telephone switches, each operated by a local telephone service provider and designated to handle calls for particular customers within a service area. Many calls require switches operated by different local telephone service providers to interact with each other to establish necessary links. In those cases, the switch at the calling party attempts to locate the switch at the called party by accessing a database of network addresses indexed according to NPA code and NXX. After receiving the network address for the called party's switch, the calling party's switch establishes a link between the switches and transmits a request for the called party's switch to complete the call to the called party.

This configuration is not adaptive to customer needs, however. For example, the network does not conveniently support "local number portability," meaning the ability of a customer to retain his telephone number when switching local telephone service providers. This often requires customers to change telephone numbers when they move from one service area to another, creating an inconvenience. This configuration also does not allow a customer to select different service providers to concurrently provide different services or features to that customer.

Increases in customer mobility and demand for portability have prompted a proposal to modify the existing telephone network to support local number portability. Such modifications may involve maintaining in a database detailed records containing information indicating, for example, which services are provided to a customer and which service providers are selected to provide those services. Such detailed records, however, must be accurately and frequently updated so that switches can rely upon those records to provide effective service to their customers. Thus, there is a need to provide a mechanism for maintaining such records within the existing telephone network. In systems providing for local number portability when there are record changes, including those caused by a number plan area split.

DISCLOSURE OF INVENTION

To achieve these and other advantages and in accordance with the purpose of the invention, as embodied and broadly described, our invention includes a method and system for handling subscription and administrative requests in a local service management system, which is used for local number portability.

In one aspect of the invention, a method for handling a subscription request comprises receiving at a local service management system the subscription request; providing a customer record from a database; determining whether a numbering plan area code split has occurred; sending the subscription request to a service control point; and performing status management functions.

In another aspect, a method for handling an NPA split request, in which a new NPA code and an old NPA code are assigned to an NPA to which a single NPA code was previously assigned, comprises accessing a first set of records containing the old NPA code; generating a second set of records from the first set containing the new NPA code; and deleting the first set of records after occurrence of the NPA split.

In yet another aspect, a method for handling a mass change request comprises updating translations for records having a Location Routing Number (LRN) designated in the mass change request, if the mass change request is for a mass update; updating translations for records having an LRN designated in the mass change request and deleting records having the designated LRN, if the mass change request is for a mass move of records; and deleting records having an LRN designated in the mass change request, if the mass change request is for a mass delete.

In still another aspect, a method for handling a query and resend request comprises transmitting a query to at least one database at a Local Service Management System (LSMS) and Service Control Point (SCP); and resending a previously transmitted subscription request, when a failure with the previously transmitted subscription request is determined.

Both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and, together with the Detailed Description, serve to explain the principles of the invention.

In the drawings:

FIG. 5 shows a flowchart representing a process in which service management program 148 processes a create request;

FIG. 6 shows a flowchart representing a process in which service management program 148 processes a delete request;

FIG. 9 shows a flowchart representing a process in which service management program 148 processes an NPA split request;

FIG. 10 shows a flowchart representing a process in which service management program 148 processes a mass change request.

BEST MODE FOR CARRYING OUT THE INVENTION

Introduction

Figure 1:
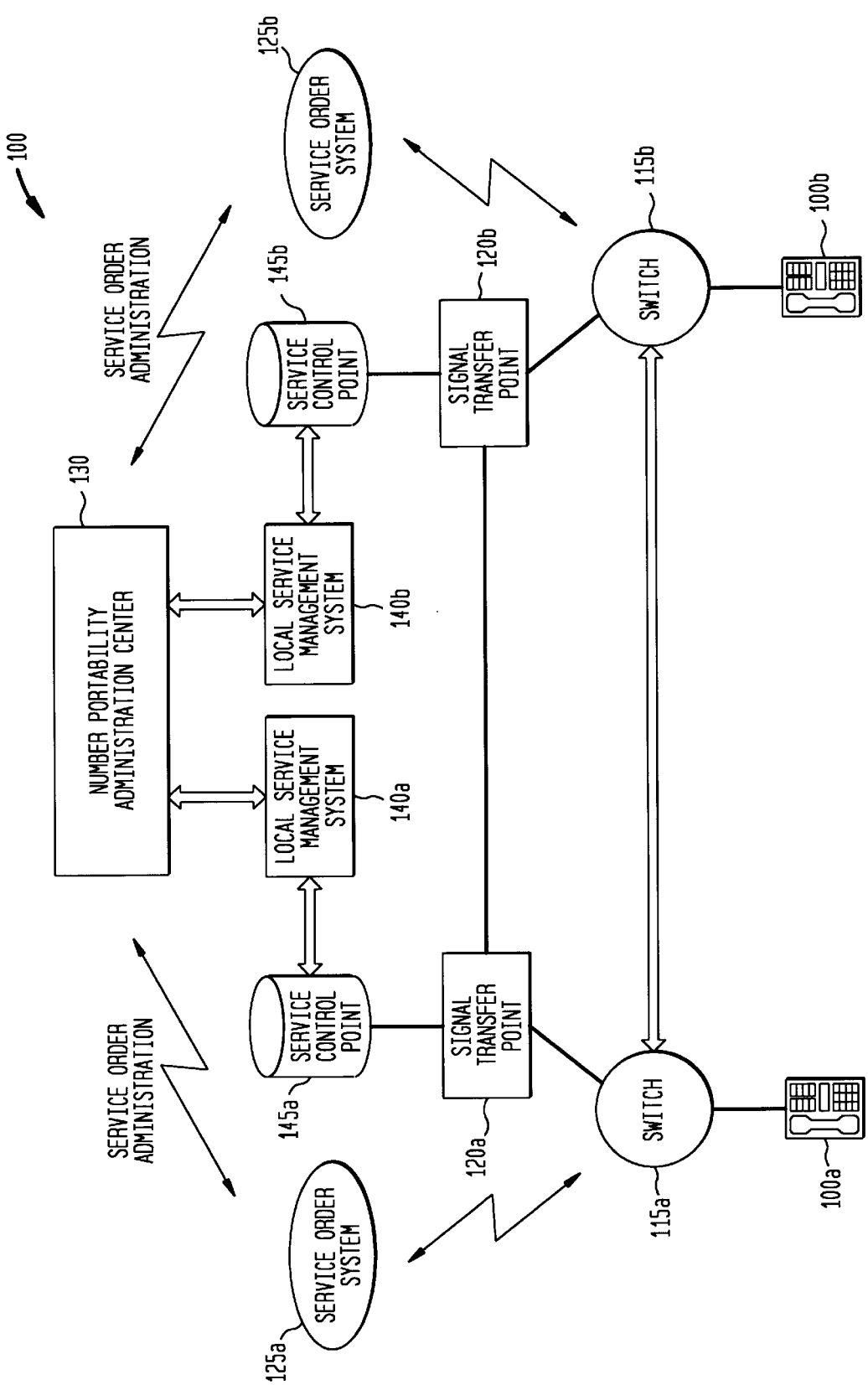
FIG. 1 is a block diagram of a system consistent with the invention.

To support local number portability and service portability in a telephone network, the method and apparatus of the invention handles subscription and administrative service requests in a local service management system to maintain records at a service control point. The subscription requests include create, modify, and delete requests of records in the service control point. The administrative service requests include NPA split, mass change, and query and resend requests. The records at the service control point are accessible by switches via respective signal transfer points to determine the network addresses of the switches handling services and calls corresponding to a particular telephone number.

Methods and apparatus of the invention are described in connection with the attached drawings. Common reference numerals are used to designate like components.

System

FIG. 1 shows one embodiment of the invention as system 100. As shown in FIG. 1, system 100 includes telephones 100a, 100b, switches 115a, 115b, signal transfer points (STP) 120a, 120b, service order systems 125a, 125b, number portability administration center (NPAC) 130, local service management system (LSMS) 140a, 140b, and service control points 145a, 145b.

Telephones 100a, 100b are connected to switches 115a, 115b, respectively, which are linked to STPs 120a, 120b, respectively, and service order systems 125a and 125b, respectively. SCPs 145a, 145b are connected to LSMS 140a, 140b, respectively, and STPs 120a, 120b, respectively. NPAC 130 is connected to service order system 125a, 125b, and LSMS 140a, 140b.

Telephones 100 and switches 115 comprise conventional components used in a telephone network. STP 120 comprise a signaling point that transfers signaling messages from one signaling link to another and preferably comprises a packet switch that transmits messages between switches and other network components. STP 120 also transmits messages between switches during normal call set-up and routing.

Service Order System 125 handles routing of service orders made by customers at telephones 100 to NPAC 130. NPAC 130 comprises a third-party administrator of the regional LNP databases. LSMS 140 processes requests from NPAC 130 and preferably comprises a local service provider owned network database which holds down-loaded ported number information. SCP comprises a transaction processor-based system that provides a network interface to database services.

Figure 2:
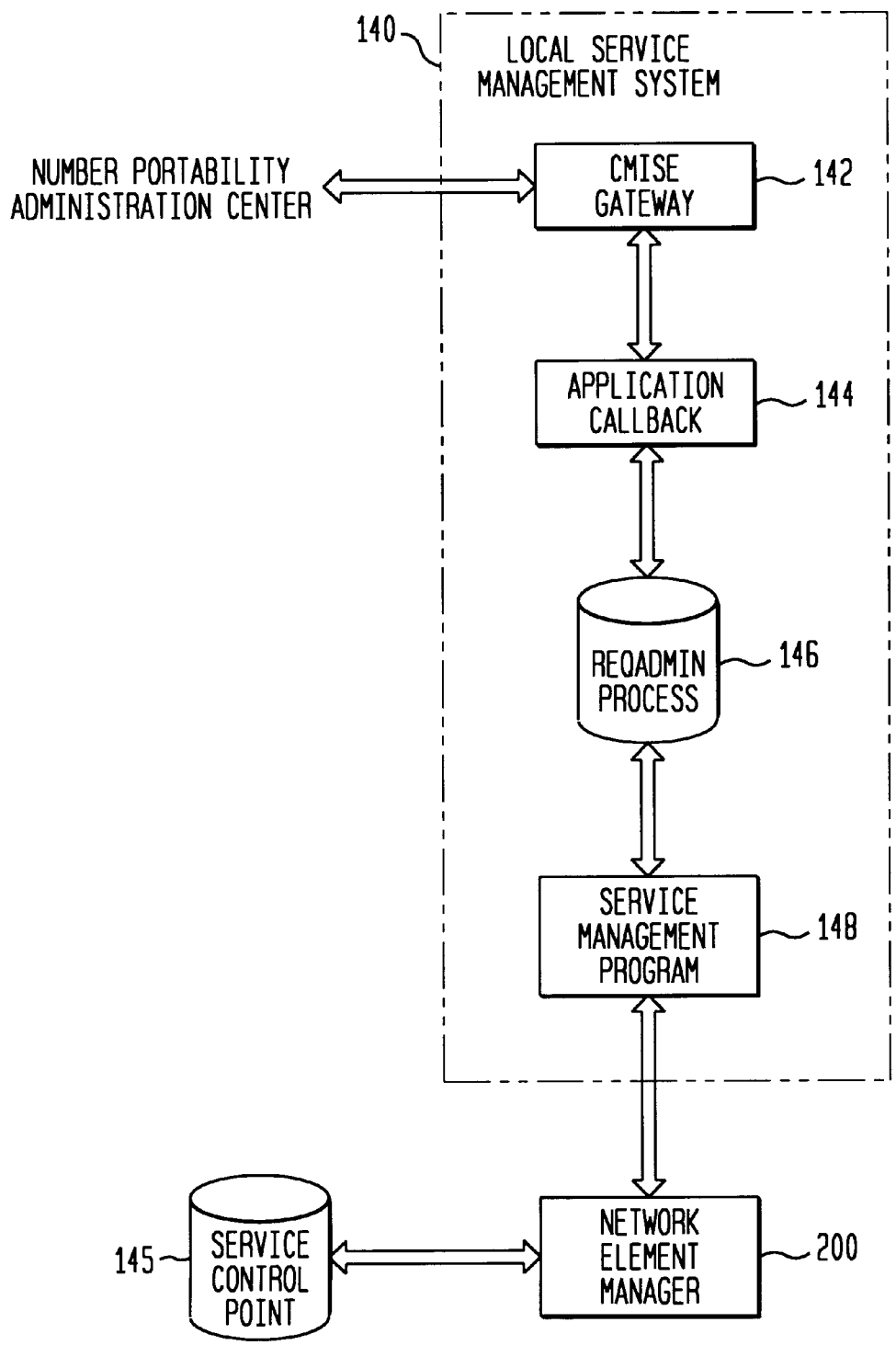
FIG. 2 is a block diagram of the local service management system 140 shown in FIG. 1.

FIG. 2 shows a block diagram of LSMS 140 according to the invention. LSMS 140 comprises CMISE (Common Management Information Service Element) gateway 142, application callback 144, ReqAdmin Process 146, and service management program (SMP) 148. These elements are connected serially with CMISE gateway 142 receiving requests from NPAC 130 and service management program 148 coupled externally to network element manager 200. In a preferred embodiment, LSMS 140 comprises a programmed server which performs the functions described herein.

CMISE gateway 142 serves as an interface to receive requests in CMISE format, validates data in the requests, and translates the requests into a format for SMP 148. Such requests may include, for example, subscription requests to create, modify, or delete customer records stored at SCP 145. Application callback 144 receives the processed requests from CMISE gateway 142, validates the requests, sets up a local subscriber record for processing by SMP 148, and builds appropriate tables.

Application callback 144 also schedules the requests for processing with ReqAdmin Process 146. ReqAdmin Process 146 maintains the schedule of requests and initiates requests for processing by SMP 148. SMP 148 processes the requests as they are received from ReqAdmin Process 146 in the manner described below in connection with FIGS. 3–11.

After processing the requests, SMP 148 transmits records to network element manager 200 for storage in SCP 145. Network element manager 200 validates the data in the records and, if valid, stores the records in SCP 145.

Operation of the SMP

Figure 3:
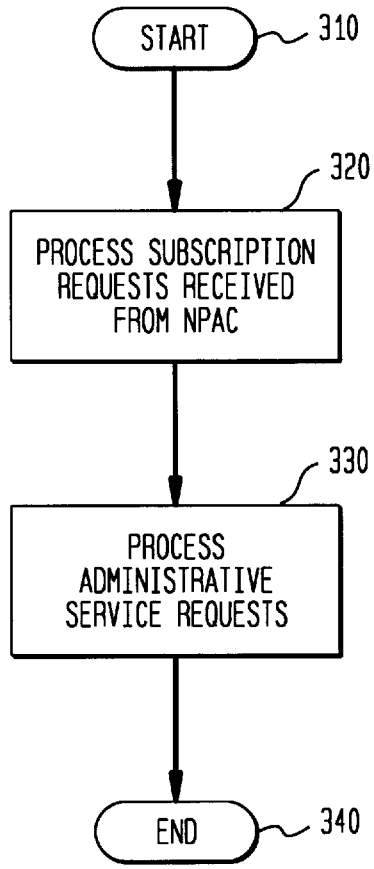
FIG. 3 shows a flowchart representing an overall process performed by service management program 148 consistent with the invention.

SMP 148 handles subscription requests and administrative service requests in its maintenance of records stored at SCP 145. FIG. 3 is a flowchart of an overall process performed by SMP 148. After initialization (step 310), SMP 148 processes subscription requests received from NPAC (step 320) and processes administrative service requests (step 330). After SMP 148 processes these requests, the process ends (step 340). The processing of subscription requests (step 320) is described in greater detail in connection with FIGS. 4–7, and the processing of administrative service requests (step 330) is described in connection with FIGS. 8–11.

Figure 4:
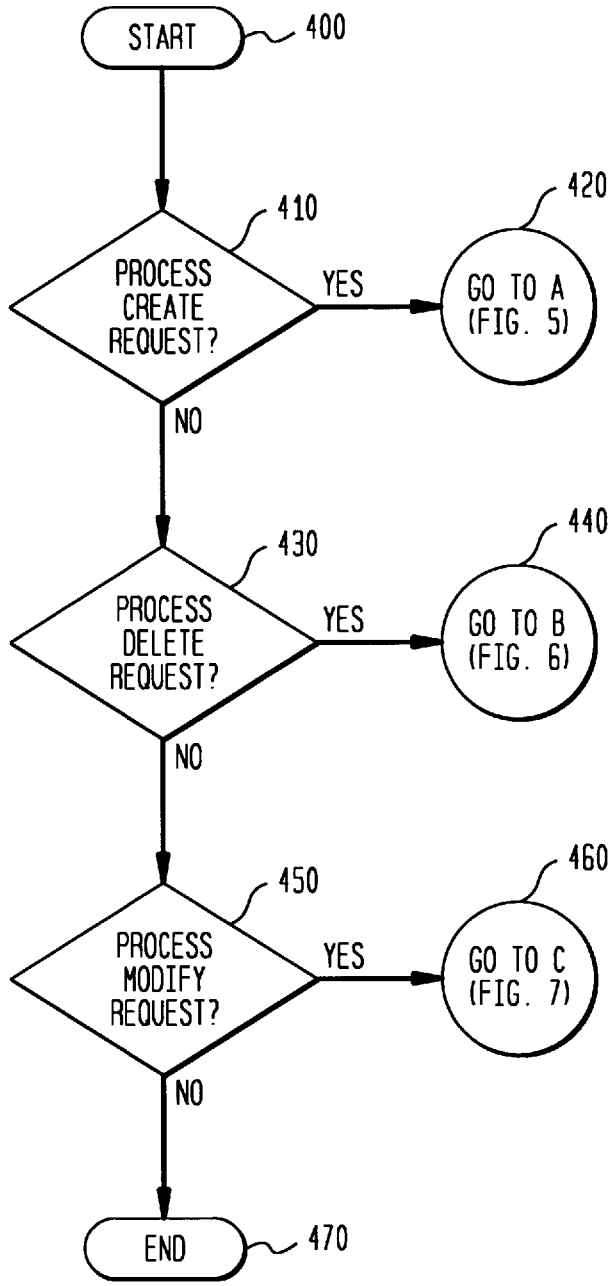
FIG. 4 shows a flowchart representing a process in which service management program 148 processes subscription requests received from the number portability administration center.

Subscription requests generally refer to requests in which customer records are created, modified, or deleted. FIG. 4 is a flowchart showing a preferred embodiment for how SMP 148 processes subscription requests. After the processing of these subscription requests is initiated (step 400), SMP 148 determines whether the subscription request is a create request (step 410). If so, SMP 148 processes the request as a subscription request (step 420), described in connection with FIG. 5. If not, SMP 148 determines whether the subscription request is a delete request (step 430). If so, SMP 148 processes the request as a delete request (step 440), described in connection with FIG. 6.

If the request is not a delete request, SMP 148 determines whether the request is a modify request (step 450). If so, SMP 148 processes the request as a modify request (step 460), described in connection with FIG. 7. If the request is not a modify request, the process ends (step 470).

FIG. 5 shows a flowchart representing a process in which SMP 148 processes a create request. To begin, a local database is initialized in LSMS 140, after which a record is retrieved from the database (step 510). SMP 148 determines whether an NPA split has occurred (step 520). An NPA split is where more than one NPA codes are assigned to a numbering plan area to which a single NPA code was previously assigned. SMP 148 keeps track of this determination for later use.

Figure 7:
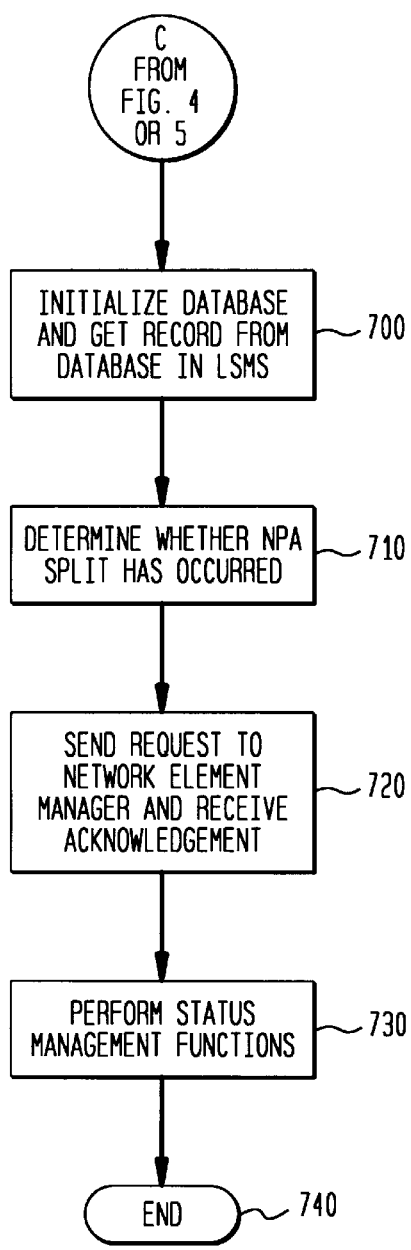
FIG. 7 shows a flowchart representing a process in which service management program 148 processes a modify request.

SMP 148 then determines whether the create request is a duplicate request (step 530). That is, whether it has previously received the same request. If so, SMP 148 processes the duplicate create request as a modify request (step 540), in which case processing continues as shown in FIG. 7.

If SMP 148 determines that the create request is not a duplicate request, it processes translations indicating the manner in which telephone services, such as 3-way calling, voice mail, and caller ID, are to be processed (step 550). Such translations may include the network addresses for the service providers that provides these services and are preferably processed according to industry standards. SMP 148 sends the create request to network element manager 200 to request that SCP 145 create a customer record corresponding to the one accessed in the local database (step 560). SMP 148 awaits acknowledgment that the create request was received properly. After receiving the acknowledgment (step 560), SMP 148 performs status management functions (step 570) after which the process concludes (step 580). Such functions may include broadcasting the create request to each SCP 145 where there are a plurality of SCPs 145 connected to SMP 148 and updating the local database to reflect the data stored in SCP 148.

FIG. 6 shows a flowchart representing a process in which SMP 148 processes a delete request. This process contains several steps that are correspondingly similar to one described in connection with FIG. 5 for the processing of a create request. To begin, a local database is initialized in LSMS 140, after which a record is retrieved from the database (step 600). SMP 148 determines whether an NPA split has occurred (step 610) and keeps track of this determination for later use.

SMP 148 then processes translations indicating the manner in which telephone services are to be processed (step 620). SMP 148 sends the delete request to network element manager 200 to request that SCP 145 delete a customer record (step 630) and awaits acknowledgment that the delete request was received properly. After receiving the acknowledgment (step 630), SMP 148 performs status management functions (step 640) after which the process concludes (step 650). One of the status management functions is preferably to delete the customer record from the local database in LSMS 140.

FIG. 7 shows a flowchart representing a process in which SMP 148 processes a modify request. This process contains several steps that are correspondingly similar to one described in connection with FIGS. 5 and 6 for the processing of create and delete requests. After beginning the process, a local database is initialized in LSMS 140, after which a record is retrieved from the database (step 700). SMP 148 determines whether an NPA split has occurred (step 710) and keeps track of this determination for later use.

SMP 148 sends the delete request to network element manager 200 to request that SCP 145 modify a customer record previously stored in SCP 145 (step 720) and awaits acknowledgment that the modify request was received properly. After receiving the acknowledgment (step 720), SMP 148 performs status management functions (step 730) after which the process concludes (step 740).

Figure 8:
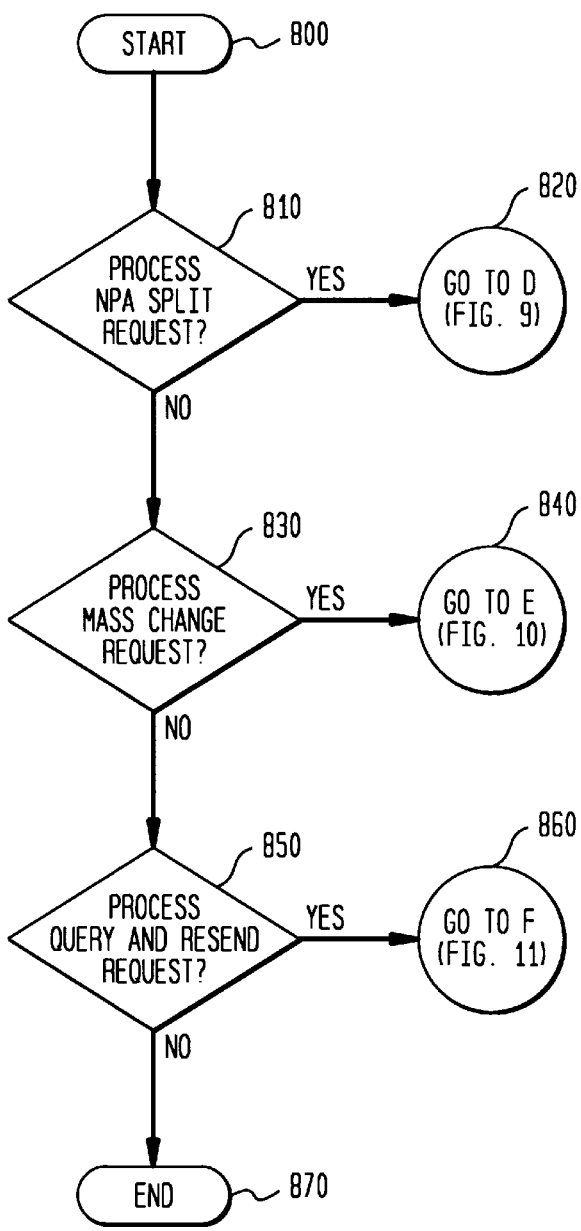
FIG. 8 shows a flowchart representing a process in which service management program 148 processes administrative service requests.

Administrative service requests generally refer to requests for maintenance and updating of existing customer records as well as requests to further process previously-made subscription requests. FIG. 8 is a flowchart showing a preferred embodiment for how SMP 148 processes administrative service requests.

After commencing the process (step 800), SMP 148 determines whether the administrative service request is an NPA split request (step 810). If so, SMP 148 processes the request as an NPA split request (step 820), described in connection with FIG. 9. If not, SMP 148 determines whether the subscription request is a mass change request (step 830). If so, SMP 148 processes the request as a mass change request (step 840), described in connection with FIG. 10.

If the request is not a mass change request, SMP 148 determines whether the request is a query and resend request (step 850). If so, SMP 148 processes the request as a query and resend request (step 860), described in connection with FIG. 11. If the request is not a query and resend request, the process ends (step 870).

FIG. 9 is a flowchart representing a process in which service management program 148 processes an NPA split request. As discussed below, an NPA split occurs where more than one NPA codes are assigned to a numbering plan area to which a single NPA code was previously assigned. This request is provided to update the NPA codes for records stored in SCP 145.

Before the NPA split occurs, SMP 148 performs a modify request, as described in connection with FIG. 7, to replicate records with the old NPA code as new records and modify the NPA codes to reflect the new NPA code (step 910). Thus, two copies of these records are stored in SCP 145, one with the new NPA code and one with the old NPA code. After the NPA split occurs, SMP 148 performs a delete request, as described in connection with FIG. 6, to delete the records containing the old NPA code (step 920), after which the process ends (step 930).

FIG. 10 is a flowchart representing a process in which service management program 148 processes a mass change request. In a preferred embodiment, there are three types of mass change requests: (1) mass update on given location routing number (LRN); (2) mass move of records from one SCP to another; and (3) mass delete of records from an SCP.

SMP 148 determines whether the mass change request is for a mass update on a given LRN (step 1010). If so, SMP 148 updates the translations for each of the records having the given LRN (step 1020) and then the process concludes (step 1070).

If the mass change request is not for a mass update, SMP 148 determines whether the mass change request is for a mass move of records from one SCP to another, as designated by an NPA code and NXX (step 1030). If so, SMP 148 performs a create request, as described in connection with FIG. 5, to create on the destination SCP a copy of every record containing the designated NPA code and NXX and performs a delete request, as described in connection with FIG. 6, for every record containing the designated NPA code and NXX located in the source SCP (step 1040), and then the process concludes (step 1070).

If the mass change request is not for a mass move, SMP 140 determines whether the mass change request is to request deletion of records from an SCP, as specified by an NPA code(s) and NXX (step 1050). If so, SMP 148 deletes the records with the designated NPA code and NXX from the SCP (step 1060). The process then ends (step 1070).

Figure 11:
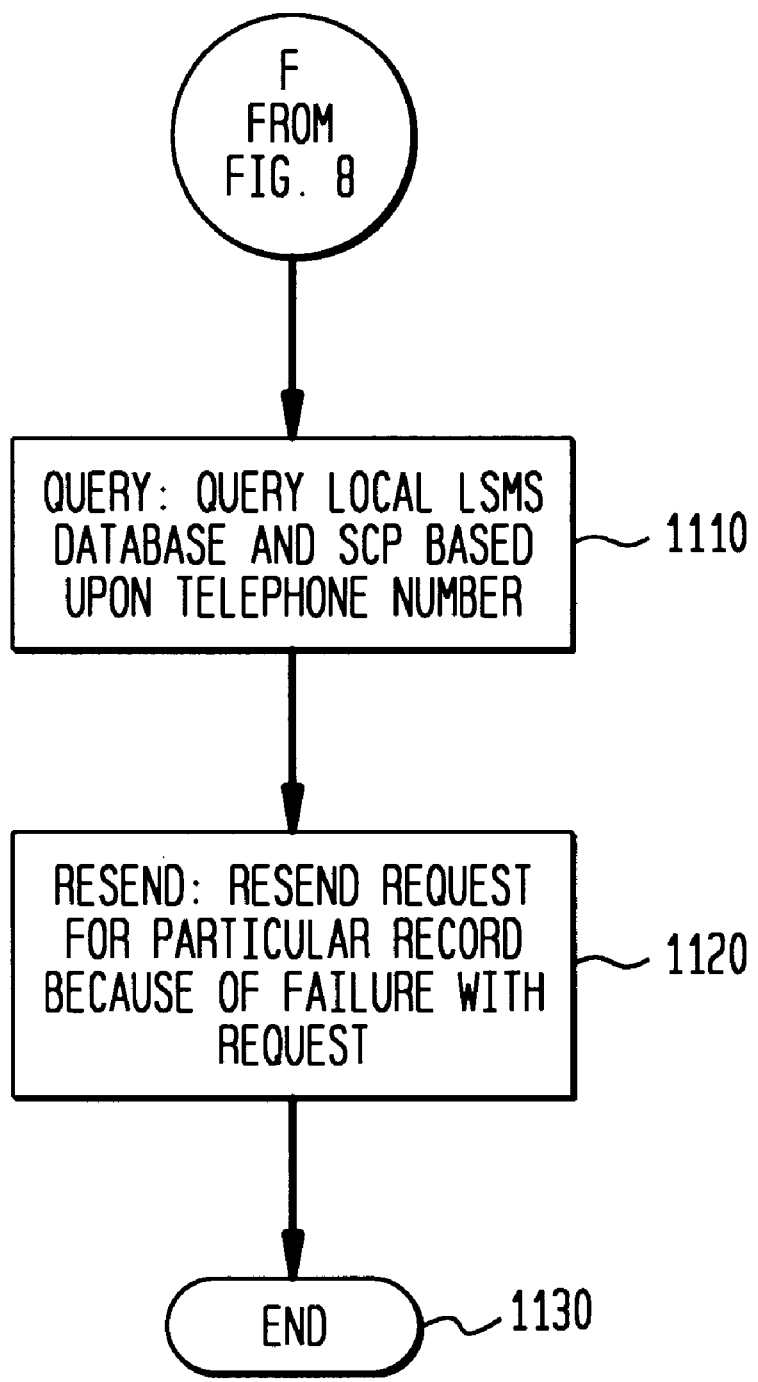
FIG. 11 shows a flowchart representing a process in which service management program 148 processes a query and resend request.

FIG. 11 is a flowchart representing a process in which service management program 148 processes a query and resend request. Such a request may be initiated to check upon a previously-issued subscription request. For a query request, SMP 148 queries the local LSMS database and SCP based upon a designated telephone number to access information from the database(s) (step 1110). For the resend request, SMP 148 transmits a resend request according to a particular record (step 1120), after which the process ends (step 1130).

Conclusion

It will be apparent to those skilled in the art that various modifications and variations can be made in the method and system of the present invention without departing from the spirit or scope of the invention. For example, the steps outlined in the processes of the invention may be performed in any order, unless other specified or required because a later step requires a values generated by an earlier step. The present invention covers the modifications and variations of this invention provided they come within the scope of the appended claims.

We claim:

1. A method for handling a subscription request to process records stored at a Service Control Point (SCP), comprising:

receiving the subscription request at a Local Service Management System (LSMS);

validating data in the subscription request;

translating the subscription request into a format understood by the LSMS;

retrieving a record from a local database within the LSMS;

determining whether a Numbering Plan Area code split has occurred and keeping track of the determination for later use;

sending the subscription request from the LSMS to a network element manager to request that an SCP process a record corresponding to the record retrieved from the local database;

awaiting acknowledgment that the subscription request sent to the network element manager was received properly;

receiving the acknowledgment; and performing status management functions.

2. The method according to claim 1, wherein the subscription request comprises a create record request.

3. The method according to claim 1, wherein the subscription request comprises a delete record request.

4. The method according to claim 1, wherein the subscription request comprises a modify record request.

5. The method according to claim 1, further comprising determining whether the received subscription request is duplicative of a previously received subscription request; and if the received subscription request is determined to be duplicative, then processing the subscription request as a modify record request.

6. The method according to claim 1, further comprising processing translations according to the received subscription request.

7. An apparatus for handling a subscription request to process records stored at a Service Control Point (SCP), comprising:

means for receiving the subscription request at a Local Service Management System (LSMS);

means for validating data in the subscription request;

means for translating the subscription request into a format understood by the LSMS;

means for retrieving a record from a local database within the LSMS;

means for determining whether a Numbering Plan Area code split has occurred and keeping track of the determination for later use;

means for sending the subscription request from the LSMS to a network element manager to request that an SCP process a record corresponding to a record retrieved by the means for retrieving;

means for awaiting acknowledgment that the subscription request sent to the network element manager was received properly;

means for receiving the acknowledgment; and means for performing status management functions.

8. The apparatus according to claim 7, wherein the subscription request comprises a create record request.

9. The apparatus according to claim 7, wherein the subscription request comprises a delete record request.

10. The apparatus according to claim 7, wherein the subscription request comprises a modify record request.

11. The apparatus according to claim 7, further comprising means for determining whether the received subscription request is duplicative of a previously received subscription request; and means for processing the subscription request as a modify record request if the received subscription request is determined to be duplicative.

12. The apparatus according to claim 7, further comprising means for processing translations according to the received subscription request.

13. A method for handling a Numbering Plan Area code split request to update Numbering Plan Area codes for records at a Service Control Point (SCP), comprising:

receiving an administrative service request at a Local Service Management System (LSMS);

determining that the administrative service request is a Numbering Plan Area code split request, wherein a new Numbering Plan Area code and an old Numbering Plan Area code are requested to be assigned to a Numbering Plan Area to which a single Numbering Plan Area code was previously assigned;

replicating a first set of records stored in an SCP containing the old Numbering Plan Area code as a second set of new records;

modifying the second set of records to reflect the new Numbering Plan Area code;

determining that a Numbering Plan Area code split has occurred; and deleting the first set of records after the occurrence of the Numbering Plan Area code split.

14. An apparatus for handling a Numbering Plan Area code split request to update Numbering Plan Area codes for records stored at a Service Control Point (SCP), comprising:

means for receiving an administrative service request at a Local Service Management System (LSMS);

means for determining that the administrative service request is a Numbering Plan Area code split request, wherein a new Numbering Plan Area code and an old Numbering Plan Area code are requested to be assigned to a Numbering Plan Area to which a single Numbering Plan Area code was previously assigned;

means for replicating a first set of records stored in an SCP containing the old Numbering Plan Area code as a second set of new records;

means for modifying the second set of records to reflect the new Numbering Plan Area code;

means for determining that a Numbering Plan Area code split has occurred; and means for deleting the first set of records after the occurrence of the Numbering Plan Area code split.

15. A method for handling a mass change request to process records stored at a Service Control Point (SCP), comprising:

receiving a mass change request at a Local Service Management System (LSMS);

determining whether the mass change request is for a mass update on a given Location Routing Number (LRN);

updating translations for records stored in an SCP having the given LRN, if the mass change request is determined to be for the mass update on the given LRN;

determining whether the mass change request is for a mass move of records from a source SCP to a destination SCP, as designated by a Numbering Plan Area code and NXX, if the mass change request is determined not to be for the mass update;

creating on the destination SCP a copy of every record located in the source SCP containing the designated Numbering Plan Area code and NXX, if the mass change request is determined to be for the mass move of records;

determining whether the mass change request is for a deletion of records from an SCP, as specified by a Numbering Plan Area code and NXX, if the mass change request is determined not to be for the mass move of records; and deleting the records containing the specified Numbering Plan Area code and NXX from the SCP, if the mass change request is determined to be for the deletion of records.

16. The method according to claim 15 further comprising determining whether the mass change request is for a copy of all records from an SCP, as designated by a Numbering Plan Area code and NXX, if the mass change is determined not to be for the mass deletion of records; and copying the records containing the specified Numbering Plan Area code and NXX from the source SCP to the destination SCP, if the mass change request is determined to be for the copying of records.

17. An apparatus for handling a mass change request to process records stored at a Service Control Point (SCP), comprising:

means for receiving a mass change request at a Local Service Management System (LSMS);

means for determining whether the mass change request is for a mass update on a given Location Routing Number (LRN);

means for updating translations for records stored in an SCP having the given LRN, if the mass change request is determined to be for the mass update on the given LRN;

means for determining whether the mass change request is for a mass move of records from a source SCP to a destination SCP, as designated by a Numbering Plan Area (NPA) code and NXX, if the mass change request is determined not to be for the mass update;

means for creating on the destination SCP a copy of every record located in the source SCP containing the designated Numbering Plan Area code and NXX, if the mass change request is determined to be for the mass move of records;

means for determining whether the mass change request is for a deletion of records from an SCP, as specified by a Numbering Plan Area code and NXX, if the mass change request is determined not to be for the mass move of records; and means for deleting the records containing the specified Numbering Plan Area code and NXX from the SCP, if the mass change request is determined to be for the deletion of records.

18. The apparatus according to claim 17, further comprising means for determining whether the mass change request is for a copy of all records from an SCP, as designated by a Numbering Plan Area code and NXX, if the mass change is determined not to be for the mass deletion of records; and means for copying the records containing the specified Numbering Plan Area code and NXX from the source SCP to the destination SCP, if the mass change request is determined to be for the copying of records.

* * * * *